United States Patent
Kritt et al.

(10) Patent No.: US 9,060,203 B2
(45) Date of Patent: Jun. 16, 2015

(54) PERSONALIZED CATEGORIZATION OF TELEVISION PROGRAMMING

(71) Applicant: International Business Machines Corporation, Armonk, NY (US)

(72) Inventors: Barry Alan Kritt, Raleigh, NC (US); Sarbajit Kumar Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 59 days.

(21) Appl. No.: 14/054,897

(22) Filed: Oct. 16, 2013

(65) Prior Publication Data

US 2015/0106852 A1 Apr. 16, 2015

(51) Int. Cl.
*H04N 21/485* (2011.01)
*H04N 21/482* (2011.01)

(52) U.S. Cl.
CPC .......... *H04N 21/485* (2013.01); *H04N 21/482* (2013.01)

(58) Field of Classification Search
CPC H04N 21/482; H04N 21/4821; H04N 21/485
USPC .......... 725/37, 38, 39, 44, 45, 46, 47
See application file for complete search history.

(56) References Cited

U.S. PATENT DOCUMENTS

| | | | |
|---|---|---|---|
| 6,546,393 B1 * | 4/2003 | Khan | 1/1 |
| 6,993,721 B2 * | 1/2006 | Rosin et al. | 715/738 |
| 2002/0053084 A1 | 5/2002 | Escobar et al. | |
| 2005/0120369 A1 | 6/2005 | Matz | |
| 2008/0081640 A1 * | 4/2008 | Tran et al. | 455/456.3 |
| 2008/0177858 A1 | 7/2008 | Aarnio et al. | |
| 2009/0144451 A1 * | 6/2009 | Cabezas et al. | 709/248 |
| 2010/0281506 A1 * | 11/2010 | Schmidt et al. | 725/46 |
| 2010/0325655 A1 * | 12/2010 | Perez | 725/30 |
| 2011/0276889 A1 * | 11/2011 | Boshernitzan | 715/738 |
| 2013/0291019 A1 * | 10/2013 | Burkitt et al. | 725/53 |
| 2013/0297827 A1 * | 11/2013 | Guan et al. | 709/245 |

OTHER PUBLICATIONS

Bellman et al., Journal of Interactive Marketing, Using Internet Behavior to Deliver Relevant Television Commercials, vol. 27, Issue 2, May 2013, pp. 130-140, http://www.sciencedirect.com/science/article/pii/S1094996812000667.

(Continued)

*Primary Examiner* — John Schnurr
(74) *Attorney, Agent, or Firm* — Garg Law Firm, PLLC; Rakesh Garg; Damion Josephs

(57) ABSTRACT

A method, system, and computer program product for personalized categorization of television content are provided in the illustrative embodiments. A subset of bookmarks is selected from a set of bookmarks saved in a browser application. The subset of bookmarks is analyzed according to a specification for constructing a categorization rule, to find information of a type corresponding to the bookmark. The categorization rule is constructed, to personalize a categorization of TV content according to a custom-categorization, by using the information as a component in the categorization rule according to the specification. The specification specifies the type, which is a type of information that can participate in the categorization rule. The rule is sent to a TV content provider system, wherein the sending causes the TV content to be organized and presented according to the custom-categorization.

20 Claims, 7 Drawing Sheets

(56) References Cited

OTHER PUBLICATIONS

Target Marketing, Tech Talk: Sapphire Web Optimizer Ties Web Behavior to B-to-B Leads, http://www.targetmarketingmag.com/article/tech-talk-sapphire-web-optimizer-ties-web-behavior-b-to-b-leads/1.

Cisco, Cisco Visual Networking Index: Forecast Q&A, http://www.cisco.com/en/US/solutions/collateral/ns341/ns525/ns537/ns705/ns827/qa_c67-482177.pdf.
Cisco, Configuring IGMP Snooping and MVR, Catalyst 2950 Desktop Switch Software Configuration Guide, 12.1(6) EA2c, http://www.cisco.com/en/US/docs/switches/lan/catalyst2950/software/release/12.1_6_ea2c/configuration/guide/swgigmp.html.

* cited by examiner

PERSONALIZED CATEGORIZATION OF TELEVISION PROGRAMMING

TECHNICAL FIELD

The present invention relates generally to a method, system, and computer program product for improving the presentation of televised content. More particularly, the present invention relates to a method, system, and computer program product for personalized categorization of television content.

BACKGROUND

Television (TV) content is organized and presented on a TV device in several ways. For example, TV content is available as a browsable guide, which presents the content in a grid-form, organized by their channel and time of performance.

Different versions of the guide are currently available. For example, one version of the guide presents the content from all those channels to which a user subscribes. Another version presents all content on all channels available from the TV content provider, whether or not the user is subscribed to a particular channel. Another version of the guide allows a user to view the content from only a customized list of channels that interests the user.

Regardless of how the channels are presented to the user, TV content providers also categorize the TV content according to preset categories. For example, some programming presents content that falls within a preset "music" category, and some programming presents content that falls within a preset "family-friendly" category. Similarly, TV content providers have defined many preset categories, including but not limited to "movies," "news", "audio," and many other categories that are common for all users.

SUMMARY

The illustrative embodiments provide a method, system, and computer program product for personalized categorization of television content. An embodiment selects, from a set of bookmarks saved in a browser application, a subset of bookmarks. The embodiment analyzes, using a processor and a memory, the subset of bookmarks according to a specification for constructing a categorization rule, to find information of a type corresponding to the bookmark. The embodiment constructs, to personalize a categorization of TV content according to a custom-categorization, the categorization rule by using the information as a component in the categorization rule according to the specification, wherein the specification specifies the type, and wherein the type is a type of information that can participate in the categorization rule. The embodiment sends the rule to a TV content provider system, wherein the sending causes the TV content to be organized and presented according to the custom-categorization.

Another embodiment includes a computer usable program product comprising a computer usable storage device including computer usable code for personalized categorization of television (TV) content. The embodiment includes computer usable code for selecting, from a set of bookmarks saved in a browser application, a subset of bookmarks. The embodiment includes computer usable code for analyzing the subset of bookmarks according to a specification for constructing a categorization rule, to find information of a type corresponding to the bookmark. The embodiment includes computer usable code for constructing, to personalize a categorization of TV content according to a custom-categorization, the categorization rule by using the information as a component in the categorization rule according to the specification, wherein the specification specifies the type, and wherein the type is a type of information that can participate in the categorization rule. The embodiment includes computer usable code for sending the rule to a TV content provider system, wherein the sending causes the TV content to be organized and presented according to the custom-categorization.

Another embodiment includes data processing system for personalized categorization of television (TV) content. The embodiment includes a storage device including a storage medium, wherein the storage device stores computer usable program code. The embodiment includes a processor, wherein the processor executes the computer usable program code. The embodiment includes computer usable code for selecting, from a set of bookmarks saved in a browser application, a subset of bookmarks. The embodiment includes computer usable code for analyzing the subset of bookmarks according to a specification for constructing a categorization rule, to find information of a type corresponding to the bookmark. The embodiment includes computer usable code for constructing, to personalize a categorization of TV content according to a custom-categorization, the categorization rule by using the information as a component in the categorization rule according to the specification, wherein the specification specifies the type, and wherein the type is a type of information that can participate in the categorization rule. The embodiment includes computer usable code for sending the rule to a TV content provider system, wherein the sending causes the TV content to be organized and presented according to the custom-categorization.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
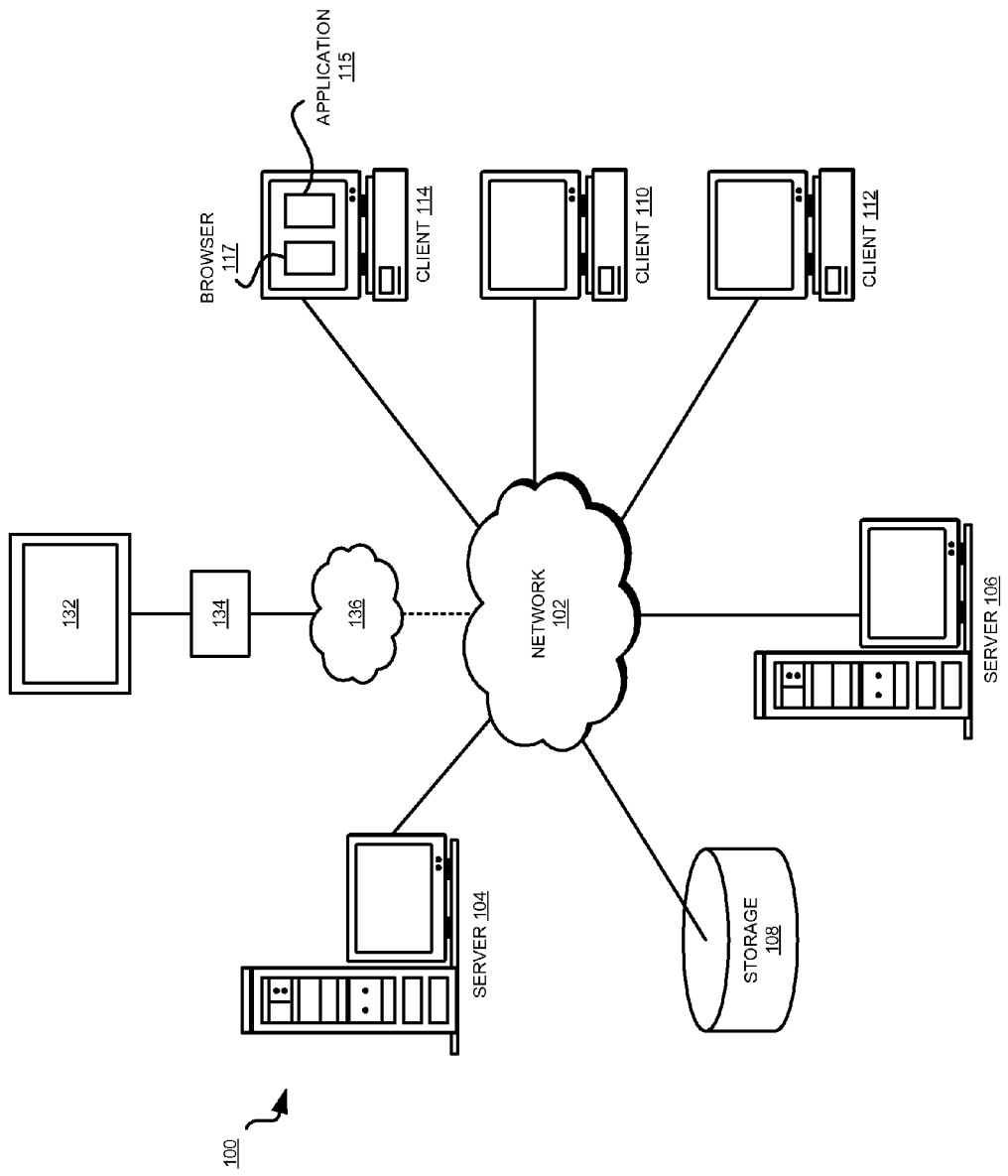
FIG. 1 depicts a block diagram of a network of data processing systems in which illustrative embodiments may be implemented.

Any content that is publicly televised is referred to as TV content herein. Any device that is capable of presenting TV content to a viewer is referred to as a TV device within the scope of the illustrative embodiments. A user within the scope of the illustrative embodiments is an individual who views, hears, or otherwise perceives the TV content. Any entity that creates, regulates, or distributes the TV content is a TV content provider within the scope of the illustrative embodiments.

The illustrative embodiments recognize that users of TV devices desire customizability of the TV content that is presented to them. Particularly, the illustrative embodiments recognize that the present categories that TV content providers use to categorize TV content do not generally reflect a user's preference.

For example, the illustrative embodiments recognize that users want to categorize TV content according to user-defined categories and sub-categories. Presently, web content is selectable, categorizable, and updatable using bookmarks in folders and subfolders in most commonly available web browsers. The illustrative embodiments recognize that a user, who has already selected and categorized web content according to the user's choice or preference in a browser, may want to leverage that choice or preference in categorizing the TV content as well.

Presently, a user of TV content can only customize the presentation of the channels and guides to the limited extent of selecting which channels to show in a guide-form. Beyond this limited customization, the user is limited to selecting TV content using rigid preset categories defined by TV content providers.

The illustrative embodiments used to describe the invention generally address and solve the above-described problems and other problems related to categorizing TV content. The illustrative embodiments provide a method, system, and computer program product for personalized categorization of television content.

Personalized categorization according to an embodiment is the custom-categorization of TV content according to user-defined categories of TV content in which the user is interested. An embodiment uses some or all of the bookmarks set in a user's browser to determine the user's preferences for categorizing TV content. The embodiment constructs a rule to categorize TV content according to the user's preference. The embodiment sends the rule to a TV content provider.

In one embodiment, the sending of the rule from a user's data processing system to a TV content provider causes the TV content provider's system to categorize the TV content according to the rule. In one embodiment, the categorization according to the rule replaces the TV content categorization using the TV content provider's preset categories. In another embodiment, the categorization according to the rule supplements the TV content categorization using the TV content provider's preset categories.

One embodiment also sends to the TV content provider an identifier of a target device using which the custom-categorized TV content is to be presented to the user. The embodiment causes a system at the TV content provider to send the custom-categorized to the target device. Some examples of the target device according to the illustrative embodiments include but are not limited to set-top devices such as cable or satellite TV boxes, digital video recorders (DVRs), routers, and cable-ready TVs.

The illustrative embodiments are described with respect to certain content, categories, devices, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
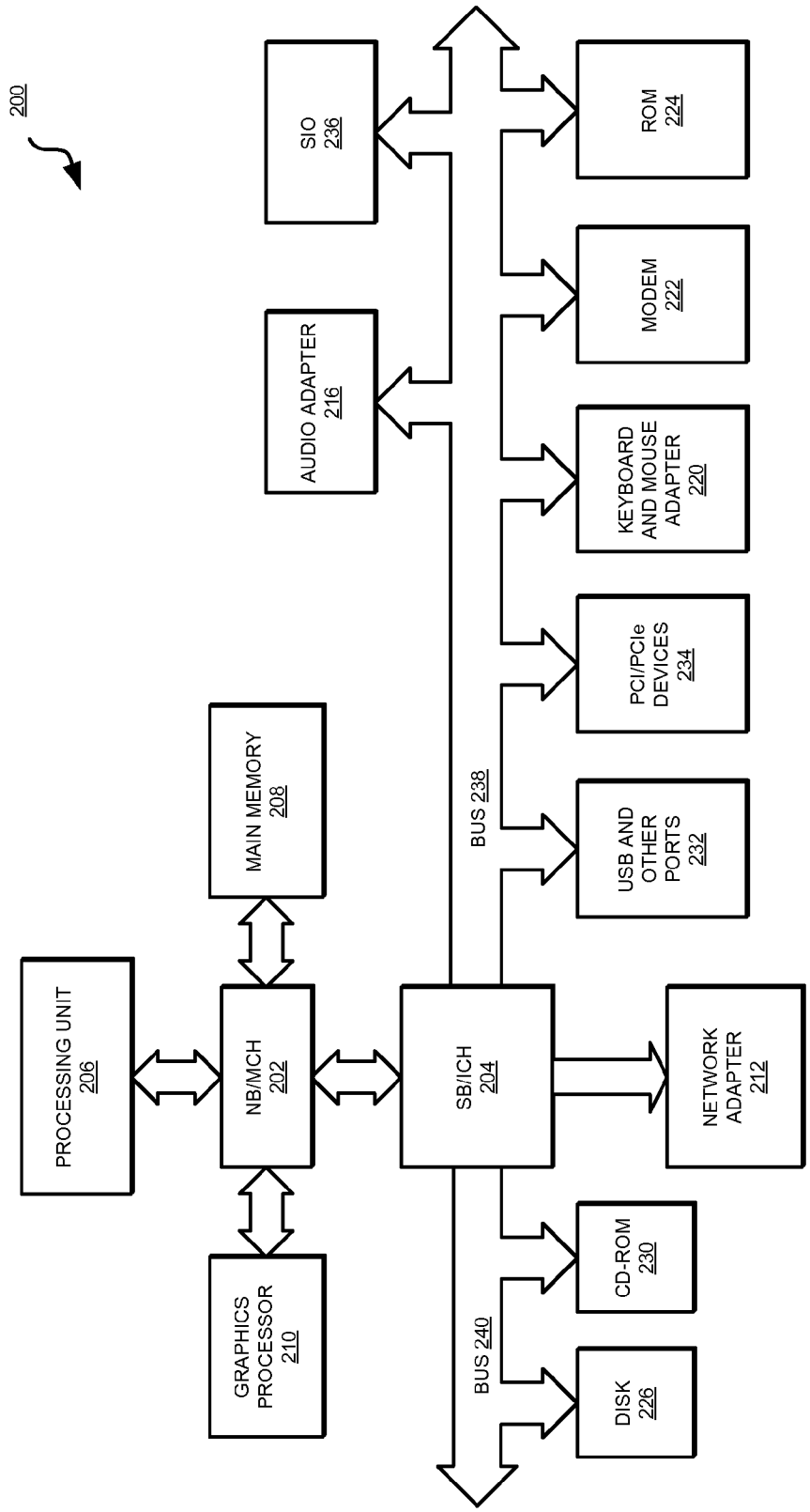
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. In one example configuration, TV unit 132, alone or in combination with TV device 134, accesses TV content over network 136. For example, network 136 may be a coaxial cable network service, a satellite based TV service, a fiber-optic data service including TV service, a broadband data network capable of carrying TV content, or any combination of these and other similarly purposed networks. Network 136 also connects one or more TV content providers (not shown) with the combination of TV unit 132 and TV device 134. Client 114 is an example data processing system used by a user to save bookmarks using browser 117 operating therein. Application 115 implements an embodiment described herein. Application 115 executes within or in conjunction with browser 117.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 115 and browser 117 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
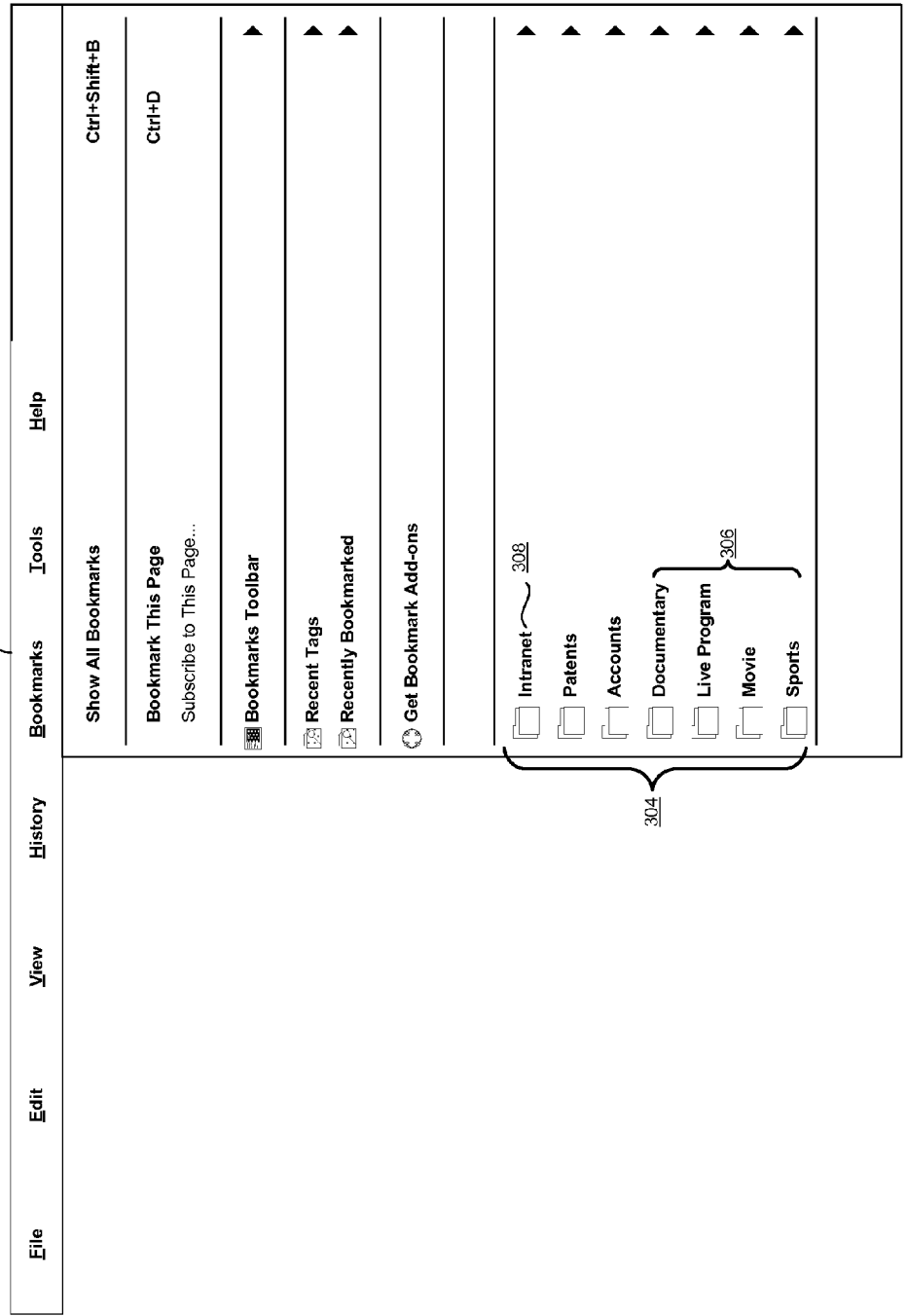
FIG. 3 depicts a block diagram of an example way of using browser bookmarks for personalized categorization of television content in accordance with an illustrative embodiment.

With reference to FIG. 3, this figure depicts a block diagram of an example way of using browser bookmarks for personalized categorization of television content in accordance with an illustrative embodiment. Bookmarks 302 can be implemented in browser 117 of FIG. 1 and used by application 115 of FIG. 1 in an embodiment.

A bookmark is any manner of referencing a data source that provides some content of some type. Typically, a web browser saves a bookmark in the form of a uniform resource locator (URL), and assigns the URL a user-friendly name or title. In a typical implementation for managing bookmarks, a user defines a set of folders and subfolders to save the bookmarks. The user names the folders and subfolders in a user-preferred manner that is indicative of the nature of the content available from the bookmarks saved in those folders and subfolders.

Folders 304 are examples of such folders for saving bookmarks. No restriction on the number of folders 304 exists within the scope of the illustrative embodiments. Furthermore, any folder 304 can include any number of subfolders therewithin, organized in a hierarchy of subfolders that is any number of levels deep. A example hierarchy of folders and subfolders presents the folders and subfolders in a parent-child relationship in a tree structure. Other manners of organizing the folders and subfolders are contemplated within the scope of the illustrative embodiments.

In the depicted example, folders 304 comprise folders 306 and other folders. Folders 306 is a group of folders—a subset of folders 304, that a user has defined for saving one or more bookmarks referencing TV content, one or more bookmarks—such as a bookmark to web-content—that the user wants to consider in customizing the categorization of TV content, or a combination thereof.

An example bookmark referencing TV content can take the form of a reference to metadata of a given TV content from a TV content provider's website. Another example bookmark referencing TV content can take the form of a reference to descriptive information about a given TV content from a TV database or another repository. Another example bookmark referencing TV content can take the form of a reference to a preview, review, critique, report, analysis, or opinion pertaining to some TV content in a publication or website.

These examples of bookmarks referencing TV content are not intended to be limiting on the illustrative embodiments. Those of ordinary skill in the art will be able to conceive from this disclosure many other ways of bookmarking TV content in a browser or browser-like application, and the same are contemplated within the scope of the illustrative embodiments.

Subset 306 of folders 304 can be any portion of folders 304. In one embodiment, subset 306 includes all folders of folders 304. In another embodiment, subset 306 includes some folders from folders 304.

For example, a user may have folder 308 in folders 304 where the user saves bookmarks into a corporate intranet. The user can exclude folder 308 from consideration in custom-categorizing TV content by excluding folder 308 from subset 306. A user can have any reason for excluding some bookmarks or bookmark folders in this manner. For example, a user may wish to exclude bookmarks to private information, such as to the login pages of the user's financial accounts.

Individual bookmarks, folders, subfolders, or other groupings of bookmarks can be included or excluded from consideration in custom-categorizing of TV content. For example, in one embodiment, a data structure representing a bookmark includes an attribute that allows a user to indicate whether the bookmark participates in the custom-categorizing of TV content. In another embodiment, a folder, subfolder, or another grouping of bookmarks includes a similar attribute for a similar purpose. In another embodiment, a bookmark within a folder, subfolder, or another grouping having such an attribute inherits the setting of the attribute at the folder/subfolder/grouping level. In another embodiment, a sub-grouping, such as a subfolder, having such an attribute inherits the setting of the attribute from the next higher level in a hierarchy.

Figure 4:
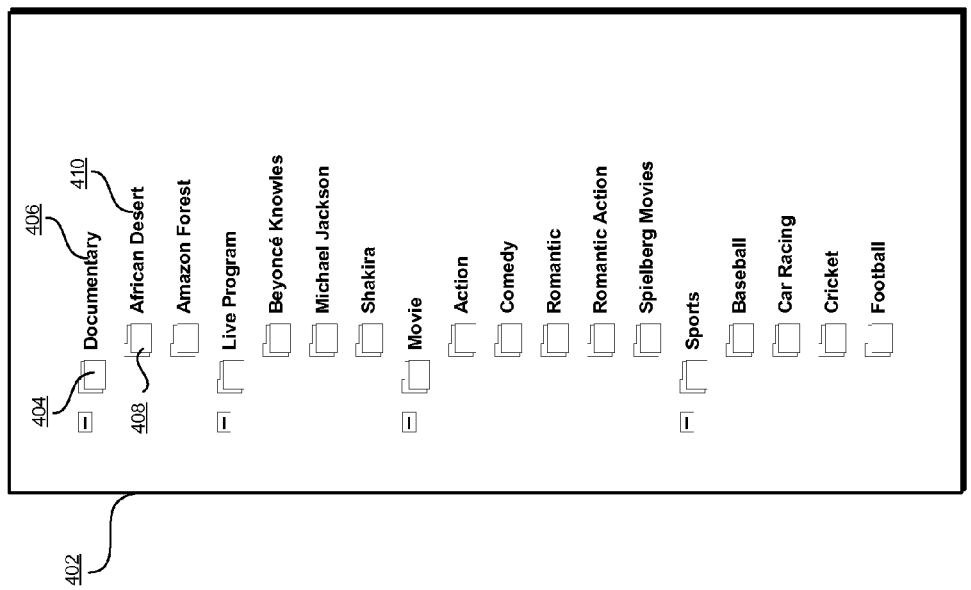
FIG. 4 depicts an example organization of bookmark folders that can be used for personalized categorization of television content in accordance with an illustrative embodiment.

With reference to FIG. 4, this figure depicts an example organization of bookmark folders that can be used for personalized categorization of television content in accordance with an illustrative embodiment. Folders 402 are an embodiment of subfolders 306 in FIG. 3.

Consider folder 404 in folders 402 as an example. Folder 404 includes user-selected title 406. Title 406 indicates how the user defines the content at the bookmarks in folder 404, including content at the bookmarks in all subfolders within folder 404. Subfolder 408 further refines the definition of the content at the bookmarks in subfolder 408.

For example, as shown, folder 404 includes bookmarks to content that the user regards as belonging in the "Documentary" category. Folder 408 includes bookmarks to content that the user regards as documentaries pertaining to the African deserts, and therefore in "African Deserts" sub-category.

An application implementing an embodiment, such as application 115 in FIG. 1, constructs rules for custom-categorizing TV content according to a user's preference. The application uses the titles, such as titles 406 and 410, in a rule-making specification. The specification directs the application as to what is to be considered in constructing the rule.

One embodiment further assigns weights or priorities to the different pieces of information that are included in the rule. For example, an embodiment uses the folder titles, such as titles 406 and 410, as the best indicators of the user's categorization preferences. Accordingly, the embodiment assigns the titles greater than a first threshold weight in the rule.

Note that the embodiment can consider the titles of any bookmark folders, such as even the folders that include bookmarks to web content, and not just TV content. An embodiment further considers for the rule-making, the titles or headings of the content that is reaches using those bookmarks in those folders. An embodiment uses the page titles as additional indicators of the user's categorization preferences. Accordingly, the embodiment assigns the titles greater than a second threshold weight in the rule.

An embodiment further considers for the rule-making, the content that is reaches using those bookmarks in those folders. An embodiment uses parts of the content, such as metadata or keywords, as additional indicators of the user's categorization preferences. Accordingly, the embodiment assigns the parts of the content greater than a third threshold weight in the rule.

An embodiment can consider any number of pieces of information reached from the bookmarks in this manner. An embodiment assigns weights to these pieces of information using any number of thresholds or ranges in the manner described above.

In one embodiment, the weight associated with a piece of information determines whether the piece of information is mandatory or optional for the custom categorization. Accordingly, an example rules template for custom-categorizing TV content may appear as follows—

Category=(information$_1$ AND information$_2$ AND (information$_3$ OR . . . OR information$_n$))

In this example rule structure, those pieces of information whose weights exceed a threshold are joined using a Boolean AND operation in the rule. Those pieces of information whose weights are below the threshold are joined using a Boolean OR operation in the rule.

This example structure of the custom-categorization rule is described only to illustrate an example operation of an embodiment and is not intended to be limiting on the illustrative embodiments. Those of ordinary skill in the art will be able to conceive from this disclosure other manners of constructing similarly purposed rules and the same are contemplated within the scope of the illustrative embodiments.

Figure 5:
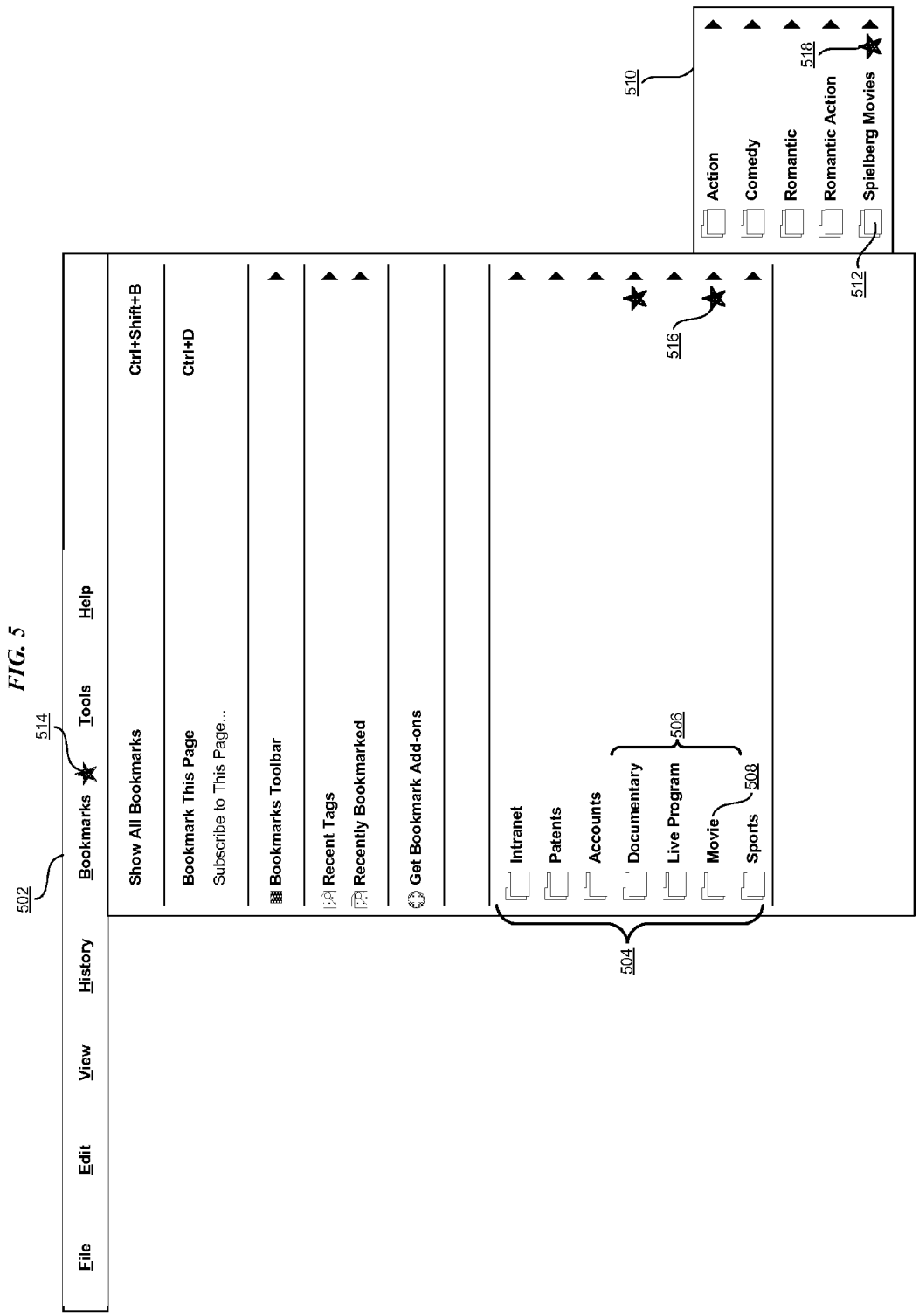
FIG. 5 depicts a block diagram of a way of notifying a user about new or changed TV content in the user's custom categories in accordance with an illustrative embodiment.

With reference to FIG. 5, this figure depicts a block diagram of a way of notifying a user about new or changed TV content in the user's custom categories in accordance with an illustrative embodiment. Bookmarks 502 can be implemented as bookmarks 302 in FIG. 3 according to an embodiment. Folders 504 can be implemented as folders 304 in FIG. 3 according to an embodiment. Folders 506 can be implemented as folders 402 in FIG. 4 or folders 306 in FIG. 3 according to an embodiment.

Folder 508 includes bookmarks that the user wants to consider for the custom category of "Movie." Subfolders 510 further refines the movie category. For example, subfolders 510 include subfolder 512, which indicates a user-defined custom-category of "Spielberg Movies."

Note that while the depicted example shows some categories that are also included in the preset categories used by TV content providers, such is not intended to be a limitation on the illustrative embodiments. Folders 506 and 510 can categorize the bookmarks, and consequently affect the categorization of TV content in any manner preferred by the user. For example, a user can select titles for folders 506 and 508 such that no title overlaps with a preset category name used by a TV content provider.

Occasionally, an application implementing an embodiment, such as application 115 in FIG. 1, searches for TV content based on the rules constructed for custom-categorization. If the application finds that some TV content that belongs in a user-defined custom-category is scheduled, or has been recorded and is available for viewing on a user's DVR, or is available for on demand streaming, the application notifies the user, and if the content is recorded or is available for on demand streaming, allows user to initiate program download and playback from within the web browser. Whether such content is scheduled is discoverable by the application executing the custom-categorization rule on the programming schedule information that is readily available from one or more TV content providers.

In one example embodiment, the notification takes the form of a visual indicator at bookmarks 502 level, folder 508 level, folder 512 level, or a combination thereof. For example, one embodiment enables a graphical icon, such as icon 514 at bookmarks 502 level, icon 516 at folder 508 level, and icon 518 at folder 512 level. Another embodiment can communicate similar information by changing colors, fonts, sizes, animation, text, or graphics at any such level. The icon-based or other similarly purposed notation in a browser notifies and attracts the attention of the user to the application's finding of interesting TV content.

Figure 6:
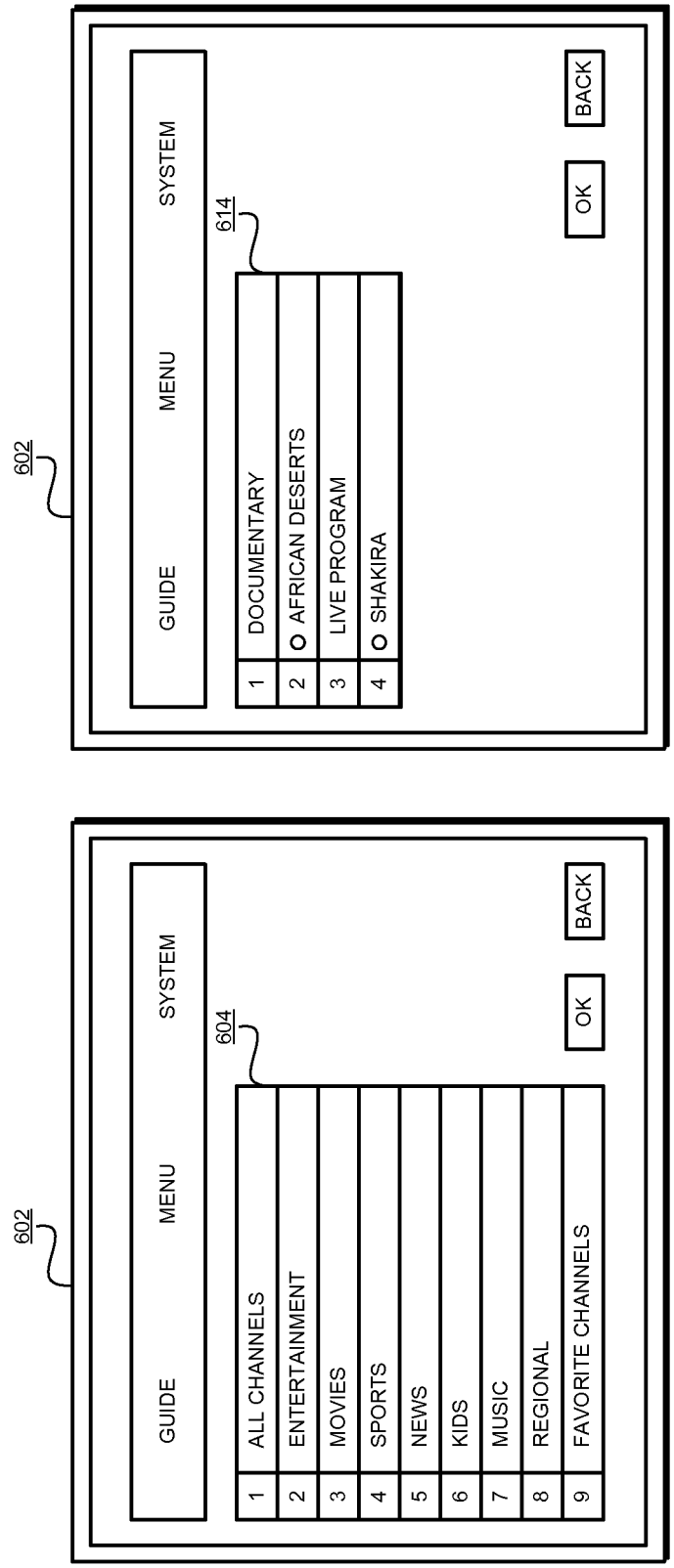
FIG. 6 depicts a personalized categorization of television content in accordance with an illustrative embodiment.

With reference to FIG. 6, this figure depicts a personalized categorization of television content in accordance with an illustrative embodiment. TV unit 602 can be used as TV unit 132 depicted in FIG. 1. Categories 604 are preset categories used by TV content providers to categorize the TV content that is scheduled in the TV programming.

In contrast, categories 604 categorize the TV content that is of interest to the user using user-defined custom categories. For example, using the example user-defined custom categories depicted in FIG. 4, custom categories 604 reveal that TV content under user's preferred categories of Documentary and Live Programs is scheduled in the TV programming.

Furthermore, custom categories 604 additionally reveal that the TV content under user's preferred categories of Documentary pertains to the user-defined custom subcategory of African Deserts, and the TV content under user's preferred categories of Live Programs pertains to the user-defined custom subcategory of Shakira.

Categories 604, the TV content reached there from, and the presentation thereof, result from the application, such as application 115 in FIG. 1, sending a rule for custom categorization to a TV content provider's system. Sending of a rule, such as the example rules described in this disclosure, to a TV content provider's system causes categories 604 to be presented.

The presentation and operation of categories 604 is controlled on TV device 602 in a similar manner as the presentation and operation of categories 602. For example, any parental controls that can be applied to categories 602 can similarly be applied to categories 604 within the scope of the illustrative embodiments. As is evident from this disclosure, custom categories 604 are significantly more useful to the user as compared to preset categories 602.

Figure 7:
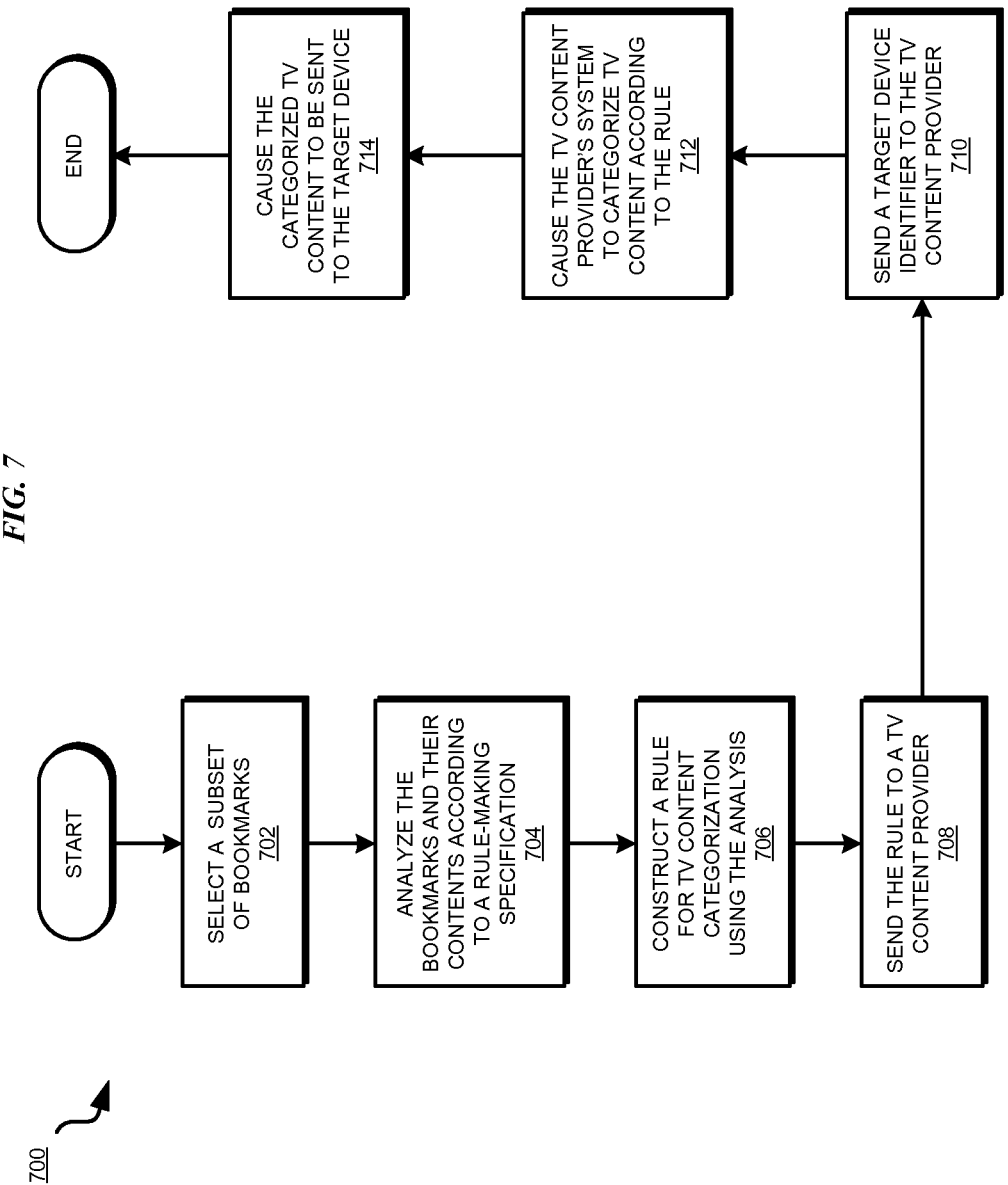
FIG. 7 depicts a flowchart of an example process of personalized categorization of television content in accordance with an illustrative embodiment.

With reference to FIG. 7, this figure depicts a flowchart of an example process of personalized categorization of television content in accordance with an illustrative embodiment. Process 700 can be implemented in application 115 in FIG. 1.

The application begins process 700 by selecting a subset of bookmarks, such as in folders 306 in FIG. 3 (block 702). The application analyzes the bookmarks, and optionally the content to which they refer, according to a specification for rule-making (block 704). For example, the application can select web-page titles, metadata, web-content, or parts of these and other information reachable from a bookmark, in block 704.

The application constructs one or more rules for TV content categorization using the analysis of block 704 (block 706). The application sends the rule to one or more TV content providers (block 708).

The application further sends an identifier associated with a target device using which the TV content provider should present the TV content organized by custom categories (block 710). In one embodiment, the target device identifier can be a set-top box identifier of a set-top box associated with the user. In another embodiment, the target device identifier can be a user ID or an account number associated with the user that can be used to identify a target device associated with the user.

The application, by sending the rule to the TV content provider, causes a system at the TV content provider to categorize the TV content according to the rule (block 712). Furthermore, the application, by sending the rule, also causes the custom-categorize TV content to be delivered or sent to the target device identified in block 710 (block 714). The application ends process 700 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for personalized categorization of television content. An embodiment enables finding TV content of interest to a user, notifying the user when such content becomes available, and organizing the content in user-defined custom categories.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can store a program for use by or in connection with an instruction execution system, apparatus, or device. The term "computer readable storage device," or variations thereof, does not encompass a signal propagation media such as a copper cable, optical fiber or wireless transmission media.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for personalized categorization of television (TV) content, the method comprising:
   selecting, from a set of bookmarks saved in a browser application, a subset of bookmarks;
   analyzing, using a processor and a memory, the subset of bookmarks according to a specification for constructing a categorization rule, to find information of a type corresponding to the bookmark;
   constructing, to personalize a categorization of TV content according to a custom-categorization, the categorization rule by using the information as a component in the categorization rule according to the specification, wherein the specification specifies the type, and wherein the type is a type of information that can participate in the categorization rule; and
   sending the rule to a TV content provider system, wherein the sending causes the TV content to be organized and presented according to the custom-categorization.

2. The method of claim 1, further comprising:
   weighting the component in the categorization rule by a weight factor, forming a weighted component, wherein the specification further provides a weight threshold; and
   requiring, when the weight factor of the weighted component exceeds the weight threshold, the information corresponding to the weighted component to be present in the TV content for categorizing the TV content under a custom category according to the categorization rule.

3. The method of claim 1, comprising:
   organizing the subset of bookmarks in a hierarchy of folders, wherein the information comprises a title of a folder in the hierarchy of folders.

4. The method of claim 3, further comprising:
   assigning a weight to the title, wherein when the weight exceeds a threshold a text of the title has to appear in the TV content for the TV content to be categorized in a category corresponding to the title.

5. The method of claim 1, wherein the information comprises a page-title of a page reached from the bookmark.

6. The method of claim 1, wherein the information comprises a keyword in a content of a page reached from the bookmark.

7. The method of claim 1, wherein the subset of bookmarks comprises a bookmark referencing content other than content relating to the television programming.

8. The method of claim 1, wherein the subset of bookmarks excludes a bookmark referencing content other than content relating to the television programming.

9. The method of claim 1, wherein the subset of bookmarks comprises bookmarks saved in a selected subset of folders from a set of folders used to save the set of bookmarks.

10. A computer usable program product comprising a computer usable storage device including computer usable code for personalized categorization of television (TV) content, the computer usable code comprising:
    computer usable code for selecting, from a set of bookmarks saved in a browser application, a subset of bookmarks;
    computer usable code for analyzing the subset of bookmarks according to a specification for constructing a categorization rule, to find information of a type corresponding to the bookmark;
    computer usable code for constructing, to personalize a categorization of TV content according to a custom-categorization, the categorization rule by using the information as a component in the categorization rule according to the specification, wherein the specification specifies the type, and wherein the type is a type of information that can participate in the categorization rule; and
    computer usable code for sending the rule to a TV content provider system, wherein the sending causes the TV content to be organized and presented according to the custom-categorization.

11. The computer usable program product of claim 10, further comprising:
    computer usable code for weighting the component in the categorization rule by a weight factor, forming a weighted component, wherein the specification further provides a weight threshold; and
    computer usable code for requiring, when the weight factor of the weighted component exceeds the weight threshold, the information corresponding to the weighted component to be present in the TV content for categorizing the TV content under a custom category according to the categorization rule.

12. The computer usable program product of claim 10, comprising:
    computer usable code for organizing the subset of bookmarks in a hierarchy of folders, wherein the information comprises a title of a folder in the hierarchy of folders.

13. The computer usable program product of claim 12, further comprising:
    computer usable code for assigning a weight to the title, wherein when the weight exceeds a threshold a text of the title has to appear in the TV content for the TV content to be categorized in a category corresponding to the title.

14. The computer usable program product of claim 10, wherein the information comprises a page-title of a page reached from the bookmark.

15. The computer usable program product of claim 10, wherein the information comprises a keyword in a content of a page reached from the bookmark.

16. The computer usable program product of claim 10, wherein the subset of bookmarks comprises a bookmark referencing content other than content relating to the television programming.

17. The computer usable program product of claim 10, wherein the subset of bookmarks excludes a bookmark referencing content other than content relating to the television programming.

18. The computer usable program product of claim 10, wherein the computer usable code is stored in a computer readable storage medium in a data processing system, and wherein the computer usable code is transferred over a network from a remote data processing system.

19. The computer usable program product of claim 10, wherein the computer usable code is stored in a computer readable storage medium in a server data processing system, and wherein the computer usable code is downloaded over a network to a remote data processing system for use in a computer readable storage medium associated with the remote data processing system.

20. A data processing system for personalized categorization of television (TV) content, the data processing system comprising:
- a storage device including a storage medium, wherein the storage device stores computer usable program code; and
- a processor, wherein the processor executes the computer usable program code, and wherein the computer usable program code comprises:
- computer usable code for selecting, from a set of bookmarks saved in a browser application, a subset of bookmarks;
- computer usable code for analyzing the subset of bookmarks according to a specification for constructing a categorization rule, to find information of a type corresponding to the bookmark;
- computer usable code for constructing, to personalize a categorization of TV content according to a custom-categorization, the categorization rule by using the information as a component in the categorization rule according to the specification, wherein the specification specifies the type, and wherein the type is a type of information that can participate in the categorization rule; and
- computer usable code for sending the rule to a TV content provider system, wherein the sending causes the TV content to be organized and presented according to the custom-categorization.

\* \* \* \* \*